(12) United States Patent
Marquering et al.

(10) Patent No.: US 7,570,811 B2
(45) Date of Patent: Aug. 4, 2009

(54) SEGMENTING AN IMAGE VIA A GRAPH

(75) Inventors: Henricus A. Marquering, Utrecht (NL); Alena V. Belitskaya, Venlo (NL)

(73) Assignee: OCE Technologies B.V., Venlo (NL)

( * ) Notice: Subject to any disclaimer, the term of this patent is extended or adjusted under 35 U.S.C. 154(b) by 940 days.

(21) Appl. No.: 10/716,616

(22) Filed: Nov. 20, 2003

(65) Prior Publication Data
US 2004/0140992 A1 Jul. 22, 2004

(30) Foreign Application Priority Data
Nov. 22, 2002 (EP) .................................. 02079880

(51) Int. Cl.
*G06K 9/00* (2006.01)
*G06K 9/34* (2006.01)
*H04N 1/40* (2006.01)

(52) U.S. Cl. .................. 382/173; 382/101; 382/105; 382/113; 382/229; 358/448; 358/462; 358/540

(58) Field of Classification Search ......... 382/168–189, 382/100–102, 105, 113, 224–231; 358/448, 358/462, 538–540
See application file for complete search history.

(56) References Cited

U.S. PATENT DOCUMENTS

| | | | | |
|---|---|---|---|---|
| 4,288,852 A | * | 9/1981 | Holland | 382/152 |
| 4,665,441 A | * | 5/1987 | Sakaue et al. | 358/448 |
| 5,321,768 A | * | 6/1994 | Fenrich et al. | 382/178 |
| 5,335,290 A | * | 8/1994 | Cullen et al. | 382/176 |
| 5,335,298 A | * | 8/1994 | Hevenor et al. | 382/199 |
| 5,416,849 A | * | 5/1995 | Huang | 382/173 |
| 5,430,808 A | * | 7/1995 | Baird et al. | 382/176 |
| 5,555,362 A | * | 9/1996 | Yamashita et al. | 715/209 |
| 5,574,802 A | * | 11/1996 | Ozaki | 382/176 |
| 5,588,072 A | * | 12/1996 | Wang | 382/176 |
| 5,680,478 A | * | 10/1997 | Wang et al. | 382/176 |
| 5,745,596 A | * | 4/1998 | Jefferson | 382/176 |
| 5,751,850 A | * | 5/1998 | Rindtorff | 382/178 |

(Continued)

FOREIGN PATENT DOCUMENTS

EP 0472313 A2 2/1992

OTHER PUBLICATIONS

Belaid Y et al., "Item Searching in Forms: Application to French Text Form" Document analysis and recognition proceedings of the third international conference on Montreal, Que., Canada, pp. 744-747 (Aug. 14-16, 1995).

(Continued)

*Primary Examiner*—Matthew C Bella
*Assistant Examiner*—Manav Seth
(74) *Attorney, Agent, or Firm*—Birch, Stewart, Kolasch & Birch, LLP

(57) ABSTRACT

A method is described for segmenting an image of pixels into a number of fields. A graph is constructed for representing the image. First, separating elements are constructed that are oblong areas of adjacent pixels having a background property indicative of a background of the image. Then vertices of the graph are defined based on intersections of separating elements that are substantially oriented in different separation directions, in particular horizontal and vertical direction, and edges of the graph are defined between the vertices corresponding to the separating elements. Finally, the edges of the graph are interpreted as lines that separate the fields.

23 Claims, 5 Drawing Sheets

U.S. PATENT DOCUMENTS

| | | | |
|---|---|---|---|
| 5,778,092 A * | 7/1998 | MacLeod et al. | 382/176 |
| 5,848,185 A * | 12/1998 | Koga et al. | 382/173 |
| 5,949,555 A * | 9/1999 | Sakai et al. | 358/462 |
| 6,167,150 A * | 12/2000 | Michael et al. | 382/149 |
| 6,226,402 B1 * | 5/2001 | Katsuyama | 382/171 |
| 6,263,113 B1 * | 7/2001 | Abdel-Mottaleb et al. | 382/237 |
| 6,470,095 B2 * | 10/2002 | Mahoney et al. | 382/199 |
| 6,577,762 B1 * | 6/2003 | Seeger et al. | 382/173 |
| 6,629,292 B1 * | 9/2003 | Corson et al. | 716/3 |
| 7,336,825 B2 * | 2/2008 | Jacobs | 382/172 |
| 7,421,371 B2 * | 9/2008 | Segers et al. | 702/183 |
| 2001/0026633 A1 | 10/2001 | Abdel-Mottaleb et al. | |
| 2003/0011794 A1 * | 1/2003 | Yao et al. | 358/1.9 |

OTHER PUBLICATIONS

Baird et al., "Image Segmentation by Shape-Directed Covers", IEEE, pp. 820-825 (1990).

Antonacopoulos et al., "Flexible Page Segmentation Using the Background", IEEE, pp. 339-344 (1994).

Wong et al., "Document Analysis System", IBM J. Res Develop, vol. 26, No. 6, pp. 647-656 (Nov. 1982).

\* cited by examiner

SEGMENTING AN IMAGE VIA A GRAPH

The present application claims, under 35 U.S.C. § 119, the priority benefit of European Patent Application No. 02079880.7 filed Nov. 22, 2002, the entire contents of which are herein fully incorporated by reference.

BACKGROUND OF THE INVENTION

1. Field of the Invention

The invention relates to a method of segmenting a composite image of pixels into a number of fields corresponding to lay-out elements of the image, the pixels having a value representing the intensity and/or color of a picture element. The invention further relates to a device implementing the method, which device comprises an input unit for inputting an image, and a processing unit.

2. Discussion of Background Art

Several methods for segmenting a composite image, such as a document including text and figures, to identify fields corresponding to layout elements, are known in the art, and a common approach is based on processing the background. The image is represented by pixels that have a value representing the intensity and/or color of a picture element. This value is classified as background (usually white) or foreground (usually black, being printed space). The white background space that surrounds the printed regions on a page is analyzed.

A method for page segmentation is known from the article "Image Segmentation by Shape-Directed Covers" by H. S. Baird et. al. in Proceedings $10^{th}$ International Conference on Pattern Recognition, Atlantic City, N.Y., June 1990, pp. 820-825. According to this method, in an image to be analyzed, a set of maximal rectangles of background pixels is constructed, a maximal rectangle being a rectangle that cannot be enlarged without including a foreground pixel. Segmentation of the image into information-bearing fields, i.e. text columns, is achieved by covering the total image with a reduced set of the maximal rectangles. The remaining 'uncovered' area is considered foreground and may be used for further analysis. A problem of this method is that the fields are defined as areas in the pixel domain, which does not allow computationally efficient further processing.

U.S. Pat. No. 6,470,095 discloses a method of page segmentation in which text areas are first preprocessed in a number of processing steps, to construct closed areas, called "enclosure blobs", of black pixels. In the remaining white spaces, bands of white space having a maximal length are constructed by suppressing bands of white space adjacent to a longer band. The final bands of white space, horizontal and vertical are then replaced by their midlines. Finally, the junctions between horizontal and vertical midlines are detected, and loose ends are cut off. The remaining midline sections are used as delimiters of text fields. This known method involves a large number of processing steps and may in some instances give inaccurate results, when white spaces connect, but their midlines do not.

Another method for page segmentation is known from the article "Flexible page segmentation using the background" by A. Antonacopoulos and R. T Ritchings in Proceedings $12^{th}$ International Conference on Pattern Recognition, Jerusalem, Israel, October 9-12, IEEE-CS Press, 1994, vol 2, pp. 339-344. According to this method, the background white space is covered with tiles, i.e. non-overlapping areas of background pixels.

The contour of a foreground field in the image is identified by tracing along the white tiles that encircle it, such that the inner borders of the tiles constitute the border of a field for further analysis. A problem of this method is that the borders of the fields are represented by a complex description which frustrates an efficient further analysis.

SUMMARY OF THE INVENTION

It is an object of the invention to provide a method and device for segmenting an image which is more efficient, and in particular delivers a simple description of the segmented image that can easily be used in further processing steps.

According to a first aspect of the invention, a method of segmenting an image of pixels into a number of fields, includes constructing separating elements corresponding to rectangular areas of adjacent pixels having a background property indicative of a background of the image; constructing a graph representing the lay-out structure of the image by defining vertices of the graph on the basis of intersections of separating elements that are substantially oriented in predetermined separation directions, in particular horizontal and vertical direction, and defining edges of the graph between the nodes corresponding to the field separators; and defining field separators corresponding to the edges of the graph.

According to a second aspect of the invention, a device for segmenting an image of pixels into a number of fields corresponding to lay-out elements of the image, the pixels having a value representing the intensity and/or color of a picture element, includes: an input unit for inputting an image; and a processing unit for constructing a graph representing the lay-out structure of the image by constructing separating elements corresponding to rectangular areas of adjacent pixels having a background property indicative of a background of the image, defining vertices of the graph based on intersections of separating elements that are substantially oriented in different separation directions, in particular horizontal and vertical direction, and defining edges of the graph between the vertices corresponding to the separating elements.

According to a third aspect of the invention, a computer program product for performing the method of the present invention is provided.

The advantage of constructing the graph is that the edges provide a compact and efficient representation of the borders of the fields. Further analysis of the fields based on the graph is computationally efficient.

The invention is also based on the following recognition. A graph representation has been proposed but rejected as being too complex in segmentation in the article by A. Antonacopoulos as described above. The inventors have seen that the graph of Antonacopoulos is not representing the fields at all, but only provides a representation of the background tiles in the image and their adjacency. The graph constructed according to the invention, however, directly covers the fields based on the structure of the background, and therefore provides a representation on a high level of the fields in the layout of the image.

It is noted that a graph representation is used for representing the layout of a document by Y. Belaid et al., "Item searching in forms: application to french tax form", Document analysis and recognition, 1995, Proceedings of the third international conference on Montreal, Que., Canada, 14-16 Aug. 1995, Los Alamitos, Calif., USA, IEEE Comput. Soc., US, 14 Aug. 1995 (1995-08-14), pp. 744-747, XP010231002, ISBN: 0-8186-7128-9. However, according to this disclosure, a graph is constructed from existing black lines in the document, that frame fields that may or may not contain text. Thus, the use of text areas and white spaces in the document image is not made, and this known method would be useless in documents not having black frame lines.

In an embodiment, the step of defining vertices comprises constructing subsets of separating elements that are substantially oriented in the predetermined separation directions, and determining the intersections between pairs of separating elements from both subsets. This has the advantage that the vertices in the graph are constructed in an efficient way.

In a further embodiment, the method comprises constructing a set of maximal rectangles, a maximal rectangle being a rectangular part of the image in one of the separation directions, that has the maximum possible area without including a pixel not having the background property indicative of a background of the image, and constructing the separating elements in a cleaning step wherein at least one pair of overlapping maximal rectangles in the set is replaced by an informative rectangle that is a rectangular part of an area combining the areas of the pair, which rectangular part has the maximum possible length in the relevant separation direction.

This has the effect that separating elements that are long and narrow along a separation direction are constructed efficiently. The advantage is that separating elements most informative for separating fields are constructed and fields enclosed by the separating elements are detected easily. Although initially a large number of maximal rectangles are found the cleaning step efficiently reduces said number so that a computationally efficient procedure for construction of the separating elements is possible.

In an embodiment of the method, prior to constructing the maximal rectangles, the image is filtered by detecting foreground separator elements that are objects in the foreground of the image having a pattern of pixel values deviating from said background property, in particular black lines or dashed or dotted lines, and by replacing pixels of the detected foreground separators by pixels having the background property. The effect of replacing foreground separators by the background color is that larger and more relevant areas of background are formed. The advantage is that larger background areas are present and without additional computational steps. This results in larger maximal rectangles, which improves the quality of the resulting segmentation.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other aspects of the invention will be apparent from and elucidated further with reference to the embodiments described by way of example in the following description and with reference to the accompanying drawings, in which.

The figures are diagrammatic and not drawn to scale. In the figures, elements which correspond to elements already described have the same reference numerals.

DETAILED DESCRIPTION OF THE PREFERRED EMBODIMENTS

Figure 1:
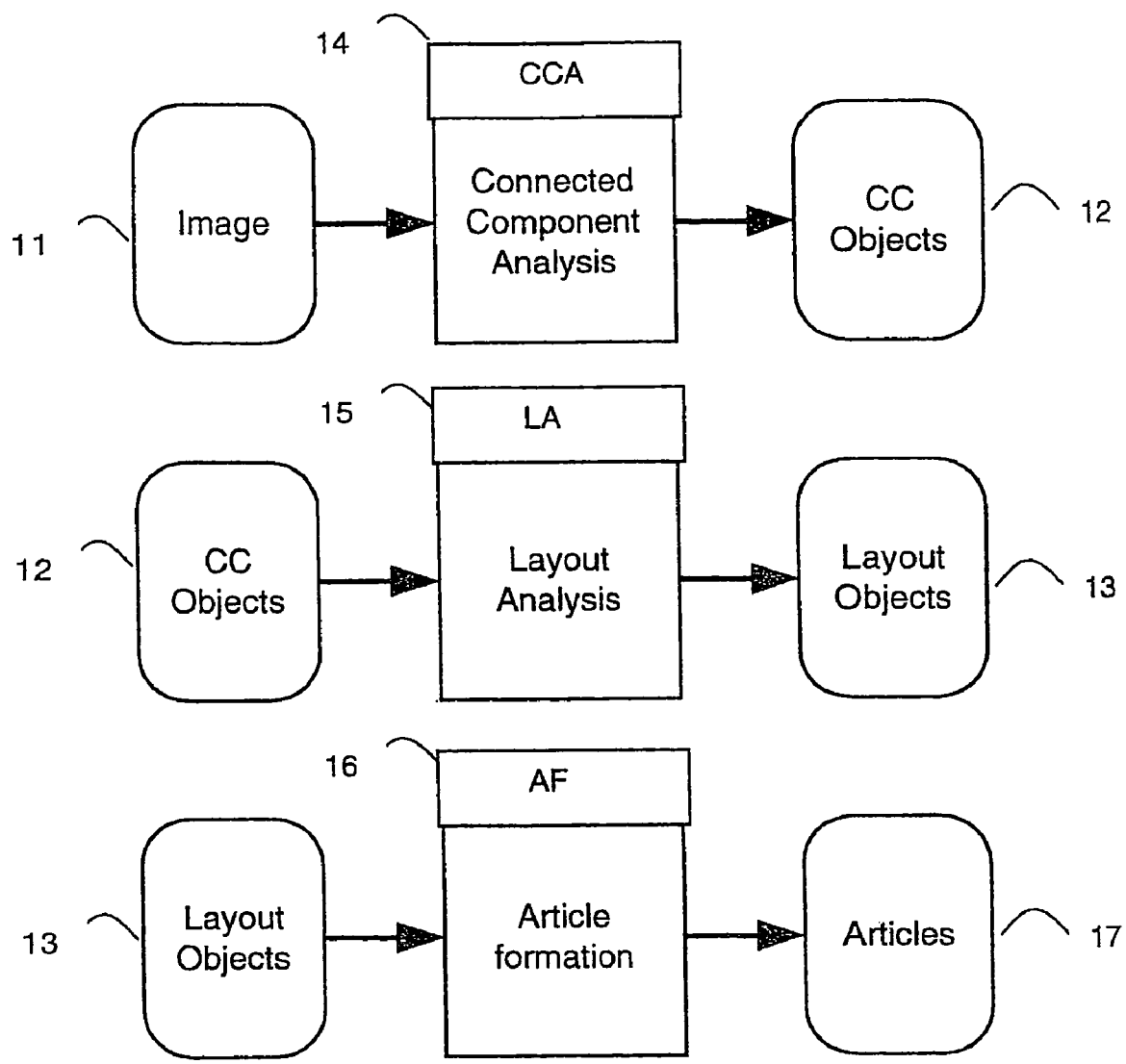
FIG. 1 shows an overview of an exemplary segmentation method usable in the present invention.

FIG. 1 shows an overview of an exemplary segmentation method showing three basic steps from known segmentation systems. Referring to FIG. 1, an input image 11 is processed in a CCA (Connected Component Analysis) module 14 that analyses the pixels of the image using Connected Component Analysis. First an original picture that may be a black-and-white, grayscale or coloured document, e.g. a newspaper page, is scanned, preferably in gray scale. Grayscale scanned pictures are halftoned for assigning a foreground value (e.g. black) or a background value (e.g. white) to each pixel. The CCA module 14 finds foreground elements in the image by detecting connected components (CC) of adjacent pixels having similar properties. An example of these first steps in the segmentation process are for instance described in U.S. Pat. No. 5,856,877.

The CCA module 14 produces as output CC Objects 12 that are connected components of connected foreground pixels. An LA (Layout Objects) module 15 receives the CC Objects 12 as input and produces Layout Objects 13 by merging and grouping the CC Objects 12 to form larger layout objects 13 such as text lines and text blocks. During this phase, heuristics are used to group layout elements to form larger layout elements. This is a logical step in a regular bottom-up procedure. An AF (Article Formation) module 16 then receives the Layout Objects 13 as input and produces Articles 17 as output by article formation. In this module 16, several layout objects that constitute a larger entity are grouped together. The larger entity is assembled using layout rules that apply to the original picture. For example in a newspaper page, the AF module 16 groups the text blocks and graphical elements like pictures to form the separate articles, according to the layout rules of that specific newspaper style. Knowledge of the layout type of the image, e.g. Western type magazine, Scientific text or Japanese article layouts, can be used for a rule-based approach of article formation resulting in an improved grouping of text blocks.

Figure 2:
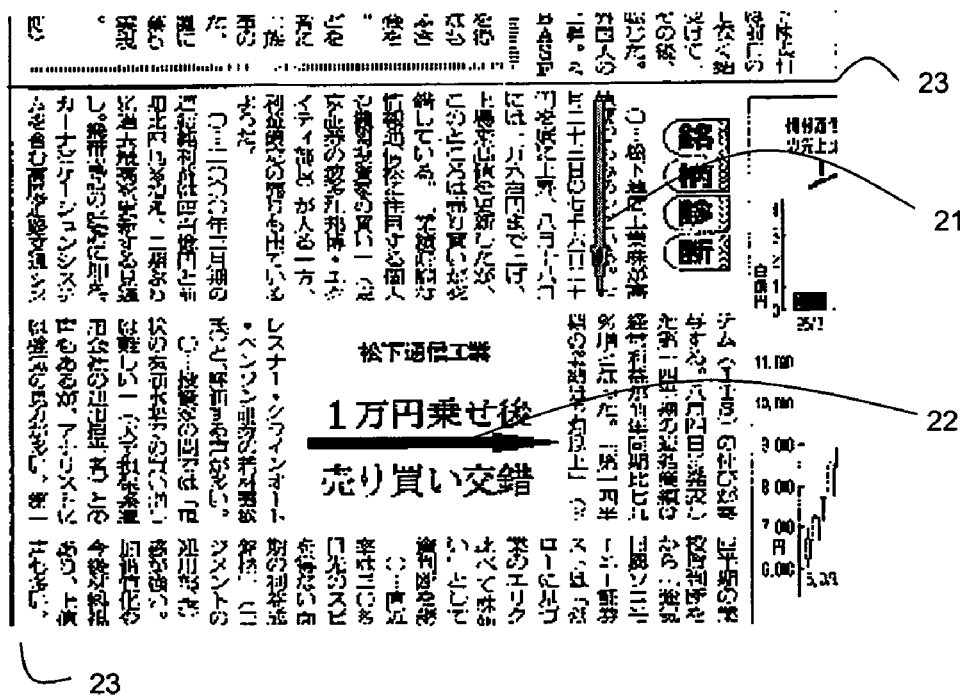
FIG. 2 shows a part of a sample Japanese newspaper.

According to the invention, additional steps are added to the segmentation as described below. These steps relate to segmentation of the image into fields before detecting elements within a field, i.e. before forming layout objects that are constituted by smaller, separated but interrelated items. FIG. 2 shows a sample Japanese newspaper. Such newspapers have a specific layout that includes text lines in both the horizontal reading direction 22 and the vertical reading direction 21. The problem for a traditional bottom-up grouping process of detected connected components is that it is not known in which direction the grouping should proceed. Hence the segmentation is augmented by an additional step of processing the background for detecting the fields in the page. Subsequently the reading direction for each field of the Japanese paper is detected before the grouping of characters is performed.

In an embodiment of the present method, separator elements, e.g. black lines 23 for separating columns are detected and converted into background elements. With this option, it is possible to separate large elements of black lines 23 containing vertical and horizontal lines that are actually connected into different separator elements. In Japanese newspapers, lines are very important objects for separating fields in the layout. It is required that these objects are recognized as lines along separation directions. Without this option, these objects would be classified as graphics. Using the option of the present invention, the lines can be treated advantageously as separator elements in the different orientations separately for each separation direction.

Figure 3:
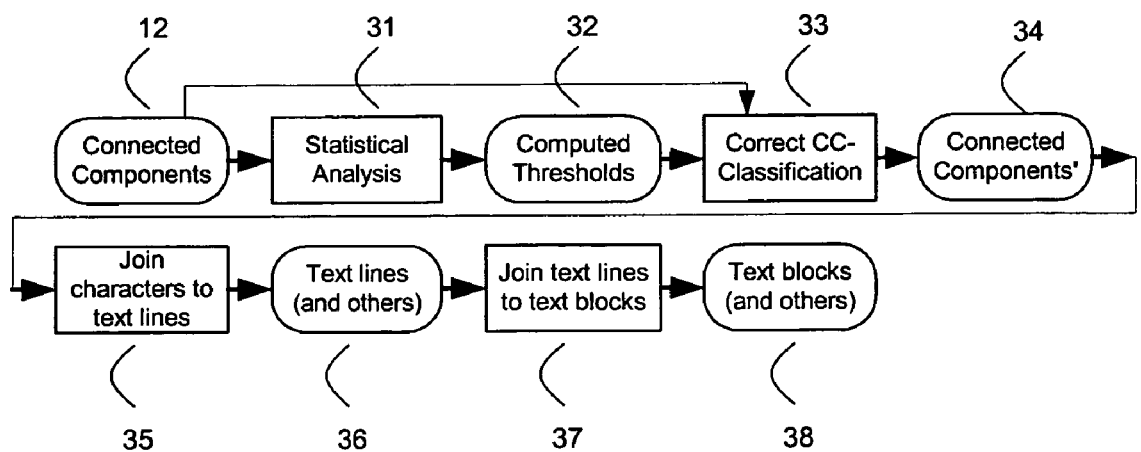
FIG. 3 shows the merging of objects along a single direction.

FIG. 3 shows a basic method of merging objects in a single direction. This figure depicts the basic function of the LA module 15 for finding the layout objects oriented in a known direction, such as text blocks for the situation that the reading order is known. Referring to FIG. 3, connected components (CC objects) 12 are processed in a first, analysis step 31 by statistical analysis resulting in computed thresholds 32. In a second, classification step 33 the CC-classification is corrected resulting in the corrected connected components 34, which are processed in a third, merging step 35 to join characters to text lines, resulting in text lines and other objects 36. In a fourth, text merging step 37 the text lines are joined to text blocks 38 (and possibly other graphical objects). According to the requirements for Japanese news papers, the traditional joining of objects must be along at least two reading directions, and the basic method described above must be improved therefor.

Figure 4:
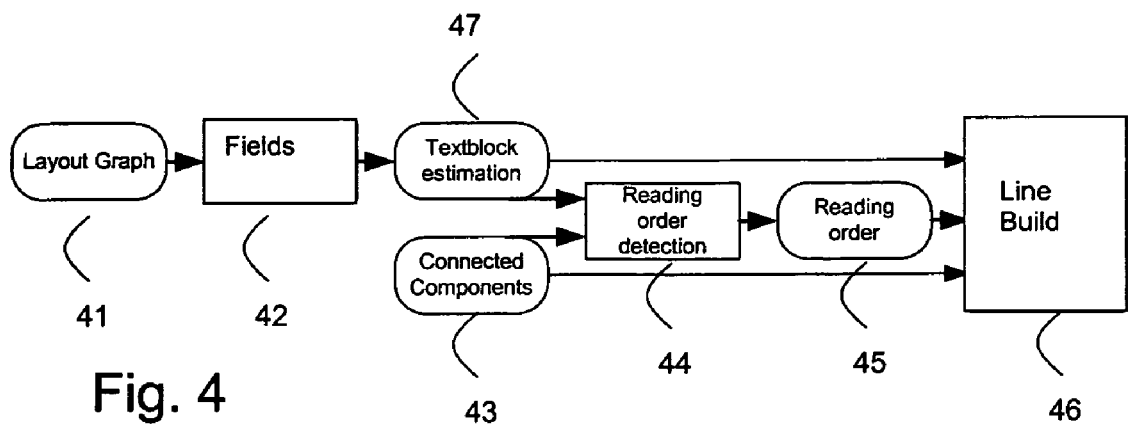
FIG. 4 shows segmentation and two directional merging of objects according to an embodiment of the present invention.

FIG. 4 shows segmentation and two directional joining of objects according to an embodiment of the present invention. In this embodiment, new additional steps have been added compared to the single directional processing in FIG. 3. Referring to FIG. 4, in a first (pre-) processing step, a graph 41 of the image is constructed. The construction of the graph by finding field separators is described below. In the graph, fields are detected in a field detection step 42 by finding areas that are enclosed by edges of the graph. The relevant areas are classified as fields containing text blocks 47. In the text block 47 (using the connected components 43 or corrected connected components 34 that are in the text block area), the reading order 45 is determined in a step 44. The reading direction detection is based upon the document spectrum. Using the fields of the text blocks 47, the contained connected components 43 and the reading order 45 as input, the Line Build step 46 joins the characters to lines as required along the direction found.

Now the constructing of the graph 41 is described. A graph-representation of a document is created using the background of a scan. Pixels in the scan are classified as background (usually white) or foreground (usually black). Because only large areas of white provide information on fields, small noise objects are removed, e.g. by down-sampling the image. The down-sampled image may further be de-speckled to remove single foreground (black) pixels.

The next task is to extract the important white areas. The first step of this task is to detect so-called white runs, one pixel high areas of adjacent background pixels. White runs that are shorter than a predetermined minimal length are excluded from the processing.

Figure 5:
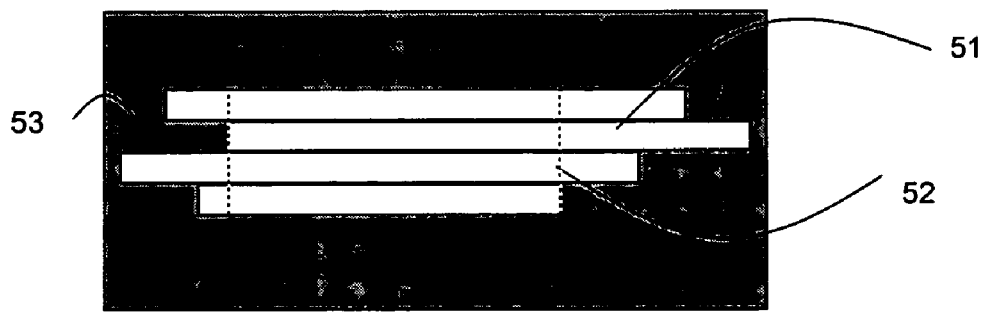
FIG. 5 shows construction of a maximal rectangle from white runs.
Figure 6:
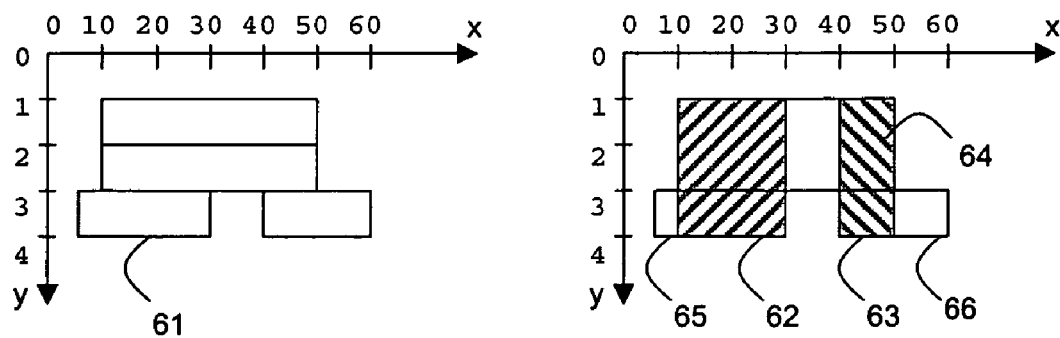
FIG. 6 shows construction of maximal white rectangles.

FIG. 5 shows, as an example, four horizontal runs 51 of white pixels, that are adjacent to each other in the vertical direction. As shown in FIG. 5, foreground area 53 is assumed to have foreground pixels directly surrounding the white runs 51. A "maximal white rectangle" is defined as the largest rectangular area that can be constructed from the adjacent white runs 51, hence a rectangular white area that can not be extended without including black (foreground) pixels. A maximal white rectangle 52 is shown based on the four white runs 51 having a length as indicated by the vertical dotted lines and a width of 4 pixels. When a white rectangle can not be extended, it has a so-called maximal separating power. Such a rectangle is not a smaller part of a more significant white area. Hence, in this example, the rectangle 52 is the only possible maximal rectangle of width 4. Further rectangles can be constructed of width 3 or 2. A further example is shown in FIG. 6.

The construction of white rectangles is done separately in different separation directions, e.g. horizontal and vertical white rectangles. Vertical white rectangles are detected by rotating the image, and detecting horizontal white runs for the rotated image. It is noted that depending on the type of image or application also, other separation directions may be selected such as diagonal.

An algorithm for constructing maximal white rectangles according to the present invention is as follows. The input of the algorithm includes all horizontal one pixel high white runs (WR) detected from a given image. Each white run is represented as a rectangle characterized by a set of coordinates $((x_1,y_1),(x_2,y_2))$, where $x_1$ and $y_1$ are coordinates of the top left corner of the rectangle and $x_2$ and $y_2$ are the coordinates of the bottom right corner of the rectangle. Each white run present in the active ordered object INPUT LIST is tested on an extension possibility. The extension possibility is formulated in the condition whether a given WR, labeled by p, can produce a maximal white rectangle (MWR) or not. If the extension possibility is FALSE, then p is already a maximal one, and p is deleted from the active INPUT LIST and written to the active. RESULT LIST. If the extension possibility is TRUE, then the test for extension is repeated until all MWRs initiated by p have been constructed. Then p is deleted from the INPUT LIST and all MWRs obtained from p are written to the active RESULT LIST. When all white rectangles from the INPUT LIST have been processed, the RESULT LIST will contain all MWRs. To increase the efficiency of this algorithm, a sort on the y value is applied to the INPUT LIST. First, the algorithm is applied for horizontal WRs, i.e. for white runs with width larger than height. And after a 90° turn of the image it can be applied to vertical WRs.

In an embodiment, the algorithm for constructing the maximal rectangles is as follows. The rectangle data are stored as a linked list, with at least the coordinates of the rectangle vertices contained in it. The INPUT and RESULT LISTs are stored as a linked list too, with at least three elements, such as the number of white rectangles, and pointers on the first and the last element in the linked list. The following steps are executed: Activate INPUT LIST; Initiate RESULT LIST; and Initiate BUFFER for temporary coordinates of the selected rectangle. Start from the first white rectangle labeled by $p_1$, out of the active ordered INPUT LIST. The next white rectangle on the list is labeled by $p_2$. For each white rectangle on the INPUT LIST, examine whether or not if $p_1$ has extension possibility. For the active white rectangle $p_1$, find the first one labeled by $p_{nj}$, $j=1, \ldots, l$, on the active ordered INPUT LIST, which satisfies $$y_2(p_1) = y_1(p_{nj}),$$

$$x_1(p_{nj}) \leq x_2(p_1), \text{ and}$$

$$x_2(p_{nj}) \geq x_1(p_1).$$

This search results in the set $\{p_{n1}, p_{n2}, \ldots, p_{nl}\}$. Only if the set $\{p_{n1}, p_{n2}, \ldots, p_{nl}\}$ is not empty, $p_1$ is said to have extension possibility.

If $p_1$ does not have an extension possibility, then $p_1$ is a maximal white rectangle. Write $p_1$ to the RESULT LIST, and remove p1 from the INPUT LIST, and proceed with $p_2$. If $p_1$ is extendible, then apply the extension procedure to $p_1$. Proceed with $p_2$. We note here, that $p_1$ can have an extension possibility while being maximal itself.

The Extension Procedure is as follows. Suppose $p_1$ has an extension possibility, then there is the set $\{p_{n1}, p_{n2}, \ldots, p_{nl}\}$. The extension procedure is applied to each element of $\{p_{n1}, p_{n2}, \ldots, p_{nl}\}$ consistently. For the white rectangle $p_1$ which is extendible with rectangle $p_{nj}$, j=1, ..., l, construct a new rectangle $p_{1,nj}$ with coordinates:

$$x_1(p_{1,nj}) = \max\{x_1(p_1), x_1(p_{nj})\},$$

$$x_2(p_{1,nj}) = \min\{x_2(p_1), x_2(p_{nj})\},$$

$$y_1(p_{1,nj}) = y_1(p_1), \text{ and}$$

$$y_2(p_{1,nj}) = y_2(p_{nj}).$$

Write the coordinates of $p_{1,nj}$, j=1, ..., l to the "coordinates" buffer. Repeat the test on extension possibility now for $p_{1,nj}$. If the test is TRUE, $p_{1,nj}$ is maximal. Write $p_{1,nj}$ to the RESULT LIST, otherwise, extend $p_{1,nj}$.

Before applying the extension procedure to $p_{1,nj}$, we check $p_1$ and $p_{nj}$ for absorption effect. The test of $p_1$ and $p_{nj}$ for absorption effect with $p_{1,nj}$ is as follows. By absorption effect we mean the situation in which $p_1$ ($p_{nj}$) or both is (are) completely contained in $p_{1,nj}$. In coordinates this means:

$$x_1(p_{1,nj}) \leq x_1(p_k),$$

$$x_2(p_{1,nj}) \geq x_2(p_k), \text{ where } k=1, n_j, j=1, \ldots, l.$$

If the condition is TRUE for $p_1$, then $p_1$ is absorbed by $p_{1,nj}$. Remove $p_1$ from the INPUT LIST. If the condition is TRUE for $p_{nj}$, then $p_{nj}$ is absorbed by $p_{1,nj}$. Remove $p_{nj}$ from the INPUT LIST.

The algorithm assumes that the rectangle is wider than it is high, and thus the rectangles are primarily horizontal. To construct MWRs in the vertical direction, the original binary image is rotated by 90° clockwise. The algorithm mentioned above is repeated for the rotated image. As a result, all vertical MWRs for the original image are constructed.

FIG. 6 shows a construction of maximal white rectangles according to an embodiment of the present invention. The pixel coordinates are displayed along a horizontal x axis and a vertical y axis. Four white runs 61 are shown left in FIG. 6. The white runs (WR) are described as rectangles with the coordinates of their upper and bottom corners correspondingly:

$WR_1$: ((10,1),(50,2)),
$WR_2$: ((10,2),(50,3)),
$WR_3$: ((5,3),(30,4)), and
$WR_4$: ((40,3),(60,4)).

All maximal white rectangles from these white runs are constructed. The resulting five maximal white rectangles (MWR) are shown in the right part of FIG. 6 as indicated by 62, 63, 64, 65 and 66. The five MWR shown are the complete set of MWR for the WR given in the left part of FIG. 6. A construction algorithm for constructing the maximal white rectangles according to the present invention is as follows.

As an example, let the INPUT LIST contain the four white runs 61. The first element from the INPUT LIST is $WR_1$((10,1),(50,2)). Label $WR_1$ as $p_1$. Examine $p_1$ on the extension possibility as described above. The first candidate for extension is $WR_2$((10,2),(50,3)). Label $WR_2$ as $p_{n1}$. Extend $p_1$ with $p_{n1}$ according to the formula for extension above, which gives a new rectangle $p_{1,n1}$ with the coordinates ((10,1),(50,3)). Test $p_1$ and $p_{n1}$ on the absorption effect with $p_{1,n1}$. As follows from absorption test, both $p_1$ and $p_{n1}$ are absorbed by $p_{1,n1}$. Therefore, delete $p_1$ and $p_{n1}$ from the INPUT LIST. Proceed with $p_{1,n1}$. Test $p_{1,n1}$ on the extension possibility, which gives the first candidate $WR_3$ ((5,3),(30,4)). Label $WR_3$ as $p_{t1}$. Extend $p_{1,n1}$ with $p_{t1}$ according to the extension formula. As a result, we obtain a new rectangle $p_{(1,n1),t1}$ with the coordinates ((10,1),(30,4)). Test $p_{1,n1}$ with $p_{t1}$ on the absorption effect with $p_{(1,n1),t1}$. The test fails.

Repeat the test on extension possibility for $p_{(1,n1),t1}$ The test fails, i.e. $p_{(1,n1),t1}$ has no extension possibility. It means that $p_{(1,n1),t1}$ is maximal. Write $p_{(1,n1),t1}$ with the coordinates ((10,1),(30,4)) to the RESULT LIST.

Proceed again with $p_{1,n1}$ and test it on extension possibility. The second candidate $WR_4$ ((40,3),(60,4)) is found. Label $WR_4$ as $p_{t2}$. Extend $p_{1,n1}$ with $p_{t2}$ according to the extension formula. As a result, we obtain a new rectangle $p_{(1,n1),t2}$ with the coordinates ((40,1),(50,4)).

Test $p_{1,n1}$ with $p_{t2}$ on the absorption effect with $p_{(1,n1),t2}$. The test fails, i.e. no absorption. Repeat test on extension possibility for $p_{(1,n1),t2}$ and the test fails, i.e. $p_{(1,n1),t2}$ has no extension possibility. It means that $p_{(1,n1),t2}$ is maximal. Write $p_{(1,n1),t2}$ with the coordinates ((40,1),(50,4)) to the RESULT LIST.

Test $p_{1,n1}$ again on extension possibility. The test fails and $p_{1,n1}$ is maximal. Write $p_{1,n1}$ with the coordinates ((10,1),(50,3)) to the RESULT LIST.

Return to the INPUT LIST. The INPUT LIST on this stage contains two write runs, i.e. $WR_3$: ((5,3),(30,4)), $WR_4$: ((40,3),(60,4)). Start from $WR_3$, and label it as $p_2$. Repeat test on extension possibility for $p_2$. The test fails, 56 $p_2$ is maximal. Write $p_2$ with the coordinates ((5,3),(30,4)) to the RESULT LIST. Remove $p_2$ from the INPUT LIST.

Proceed with $WR_4$ and label it as $p_3$. Test on extension possibility for $p_3$ gives us that $p_3$ is maximal. Write $p_3$ with the coordinates ((40,3),(60,4)) to the RESULT LIST. Remove $p_3$ from the INPUT LIST. Finally, the RESULT LIST contains five maximal white rectangles, i.e. $MWR_1$: ((10,1),(50,3)) indicated in FIG. 6 as 64, $MWR_2$: ((10,1),(30,4)) indicated as 62, $MWR_3$: ((40,1),(50,4)) indicated as 63, and $MWR_4$: ((5,3),(30,4)) as 65, $MWR_5$: ((40,3),(60,4)) as 66.

Figure 7:
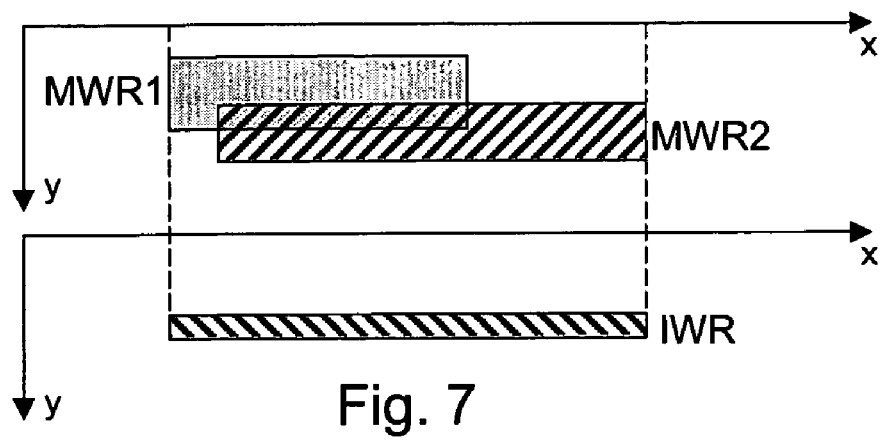
FIG. 7 shows cleaning of overlapping maximal white rectangles.

FIG. 7 shows a next step in the method according to the invention, namely a cleaning step of overlapping maximal white rectangles. In the cleaning step, plural overlapping maximal white rectangles are consolidated into a single so-called "Informative Maximal Rectangle" (IWR) that combines the most relevant properties of the original maximal white rectangles, as discussed below in detail.

The cleaning step may further include steps like checking on size and spatial relation. The upper part of FIG. 7 shows, as an example, two maximal white rectangles MWR1 and MWR2. The pair is consolidated into a single Informative White Rectangle IWR in the cleaning step as shown in the lower part of FIG. 7. The process of detecting an overlap and consolidating is repeated until no relevant pairs can be formed anymore. A criterion for forming pairs may be the size of the overlap area.

Further, the cleaning step may include removing thin or short rectangles or rectangles that have an aspect ratio below a certain predefined value. The criteria for removing are based on the type of image, e.g. a width below a predefined number of pixels indicates a separator of text lines and is not relevant for separating fields, and a length below a certain value is not relevant in view of the expected sizes of the fields.

An algorithm for the cleaning step according to the present invention is as follows. The start of the cleaning procedure is the whole set of MWRs constructed as described above with reference to FIGS. 5 and 6. The cleaning procedure is applied to discard non-informative MWRs. For this reason a measure of non-informativeness is defined. For example, a long MWR is more informative than a short one. A low aspect ratio indicates a more or less square rectangle that is less informative. Further, extremely thin rectangles, which for instance separate two text lines, must be excluded. First, all MWRs are classified as being horizontal, vertical or square by computing the ratio between their heights and widths. Square MWRs are deleted because of their non-informativeness. For the remaining horizontal and vertical MWRs, the cleaning technique is applied which includes three steps:

Each MWR with a length or width below a given value is deleted.

Each MWR with aspect ratio (AR), defined as the ratio of the longer side length divided by the shorter side length, below a given value is deleted.

For each pair of overlapping horizontal (or vertical) $MWR_1$ $((x_1,y_1),(x_2,y_2))$ and horizontal (or vertical) $MWR_2$ $((a_1,b_1),(a_2,b_2))$, an informative white rectangle IWR is constructed with the following coordinates:

(a) Horizontal overlap:
$x_1$=min $\{x_1, a_1\}$,
$y_1$=max $\{y_1, b_1\}$,
$x_2$=max $\{x_2, a_2\}$,
$y_2$=min $\{y_2, b_2\}$.

(b) Vertical overlap:
$x'_1$=max $\{x_1, a_1\}$,
$y'_1$=min $\{y_1, b_1\}$,
$x'_2$=min $\{x_2, a_2\}$,
$y'_2$=max $\{y_2, b_2\}$.

This process is repeated for all pairs of overlapping MWRs. The set of MWRs now comprises Informative White Rectangles IWRs. These IWRs form the starting point for an algorithm for segmentation of the image into fields corresponding to the lay-out elements. The IWRs are potential field separators and are therefore called "separating elements". Using the IWRs, the algorithm constructs a graph for further processing into a geographical description of the image.

Figure 8:
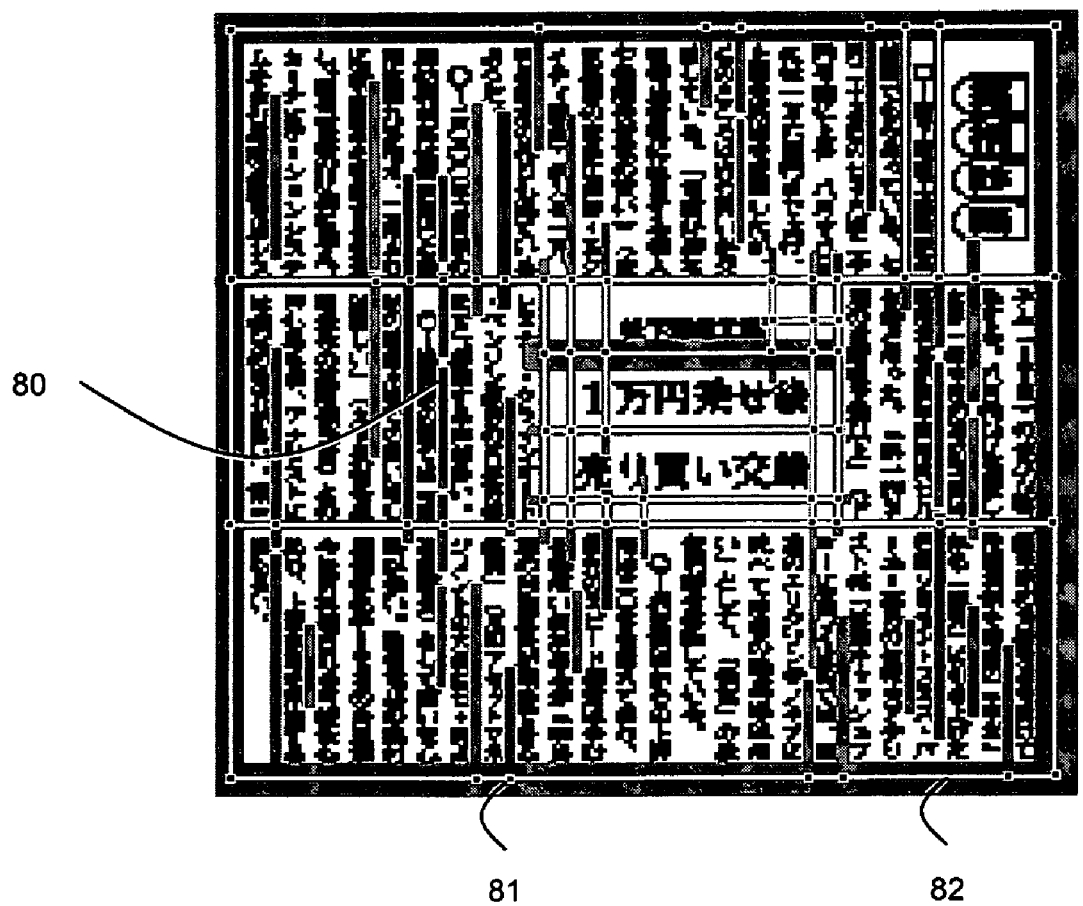
FIG. 8 shows a graph on a newspaper page.

FIG. 8 shows such a graph on a newspaper page. The picture in FIG. 8 shows a down-sampled digital image 80 of a newspaper page. The original text is visible in black in a down-sampled version corresponding to FIG. 2. The informative rectangles IWR constituting separating elements are shown in gray. For the construction of the graph, intersections of separating elements constituted by horizontal and vertical white IWRs are determined. The intersection point of two IWRs is indicated by a small black square representing a vertex or vertex 81 in the graph. Edges 82 that represent lines that separate the fields in the page are constructed by connecting pairs of vertices 81 via "field separators". The edges 82 of the graph are shown in white. The distance between the two vertices of an edge, i.e. the length, is assigned as weight to the edge for further processing. In an alternative embodiment a different parameter is used for assigning the weight, e.g. the colour of the pixels. An algorithm for constructing the graph is as follows.

At the beginning, the following notation and definitions for IWRs is given. Let $R=\{r_1,\ldots,r_m\}$ be the non-empty and finite set of all IWRs obtained from a given image I, where each IWR is specified by its x- and y- coordinates of top left corner and bottom right corner $((x_1^{(\tau)}, y_1^{(\tau)}), (x_2^{(\tau)}, y_2^{(\tau)}))$, $\tau=1, 2, \ldots, m$ respectively. Each rectangle $r_\tau$ is classified as horizontal, vertical or square based on the ratio of its height and width. $H=\{h_1, \ldots, h_j\}$, $V=\{v_1, \ldots, v_k\}$, and $S=\{s_1, \ldots, s_d\}$ denote the subsets of horizontal, vertical and square IWRs, respectively, such that $H \cup V \cup S = R$ and $m=l+k+d$, and $H \cap V = \emptyset$, $V \cap S = \emptyset$, $H \cap S = \emptyset$ where it is assumed that $H \neq \emptyset$, $V \neq \emptyset$.

Further the contents of S are ignored and only the subsets H and V are used. This is based on the consideration that in most cases, white spaces that form the border of text or non-text blocks are oblong vertical or horizontal areas. Let h be part of H with coordinates $((x_1,y_1),(x_2,y_2))$ and v in V with coordinates $((a_1,b_1),(a_2,b_2))$. Then h and v have overlap if $$\begin{cases} x_1 \leq a_2 \\ y_1 \leq b_2 \\ x_2 \geq a_1 \\ y_2 \geq b_1 \end{cases}$$

By the intersection point of h and v in case of overlap, we take the unique point P defined by the coordinates:

$$\begin{cases} x_P = \frac{1}{2}(\max\{x_1, a_1\} + \min\{x_2, a_2\}), \\ y_P = \frac{1}{2}(\max\{y_1, b_1\} + \min\{y_2, b_2\}) \end{cases}$$

For IWRs, only two from all possible types of overlap occur, namely overlap resulting in a rectangle and overlap resulting in a point. Line overlap cannot occur, because this would be in contradiction with the concept of the MWRs.

Figure 9:
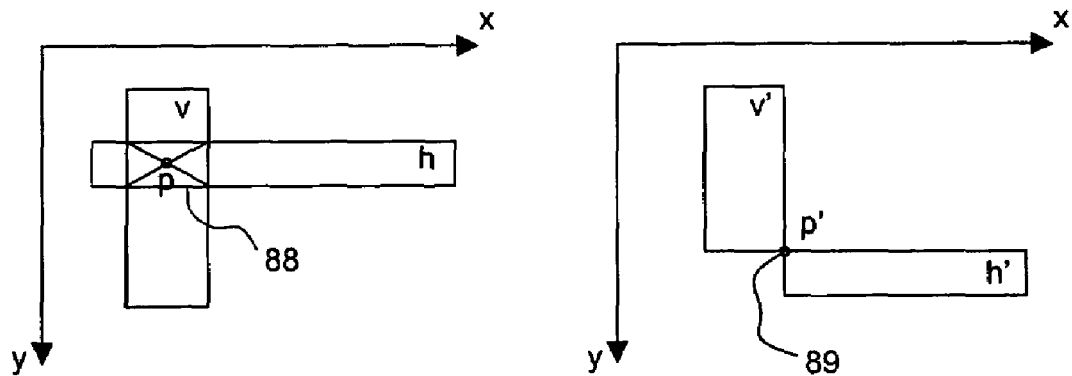
FIG. 9 shows two types of intersection of maximal rectangles.

FIG. 9 shows two types of intersection of maximal rectangles. For constructing the graph, the intersection points of vertical and horizontal informative maximal rectangles are determined to find the position of vertices of the graph, i.e. to determine the exact coordinates of the vertices. The left part of FIG. 9 shows a first type of intersection of vertical IWR v and a horizontal IWR h, which results in a rectangular area 88 with a center of intersection point P. The right part of FIG. 9 shows a second type of intersection of a vertical IWR v and a horizontal IWR h, that results in a single intersection point 89 with a center of intersection at P'.

An algorithm for constructing the graph based on the intersection points is as follows.

$P=\{p_1, \ldots, p_N\}$ denotes the set of all intersection points of vertical IWRs and horizontal IWRs where each p in P is specified by its x- and y- coordinates $(x_p, y_p)$, where $p=1, \ldots, N$. Let the set P be found, and $G=(X,A)$ an undirected graph having correspondence to P. The graph $G=(X,A)$ includes a finite number of vertices X which are directly related to the intersection points and a finite number of edges A which describe the relation between intersection points. Mathematically this is expressed as $G(P)=(X(P), A(P \times P))$, $P: H \times V \to \{x_P, y_P\}$, where $X=\{1, \ldots, N\}$ and $A=(\{1, \ldots, N\} \times \{1, \ldots, N\})$ with $$A(i, j) = \begin{cases} \infty, \text{ if } i \text{ and } j \text{ are not 4-chain connected,} \\ d_{ij}, \text{ if } i \text{ and } j \text{ are 4-chain connected} \end{cases}$$

where $d_{ij}$ indicates the Euclidean distance between points i and j, and where 4-chain connected means that the vertices of a rectangular block are connected in four possible directions of movement. In the above, two points i and j are 4-chain connected if they can be reached by walking around with the aid of 4-connected chain codes with min $d_{ij}$ in one direction.

The graph as constructed may now be further processed for classifying the areas within the graph as text blocks or a similar classification depending on the type of picture. In an embodiment, the graph is augmented by including foreground separators, e.g. black lines or patterned lines such as dashed/dotted lines, in the analysis. Also, edges of photos or graphic objects which are detected can be included in the analysis.

The present segmenting method may also include a step of removing foreground separators. In this step, first, foreground separators are recognized and reconstructed as single objects. The components that constitute a patterned line are connected by analyzing element heuristics, spatial relation heuristics and line heuristics, i.e. building a combined element in a direction and detecting if it classifies as a line. A further method for reconstructing a solid line from a patterned line is down-sampling and/or using the Run Length Smoothing Algorithm (RLSA) as described by K. Y. Wong, R. G. Casey, F. M. Wahl in "Document analysis system", IBM J. Res. Dev 26 (1982) 647-656. After detecting the foreground separators, they are replaced by background pixels. The effect is that larger maximal white rectangles can be constructed, or supporting any other suitable method using the background pixel property for finding background separators.

Figure 10:
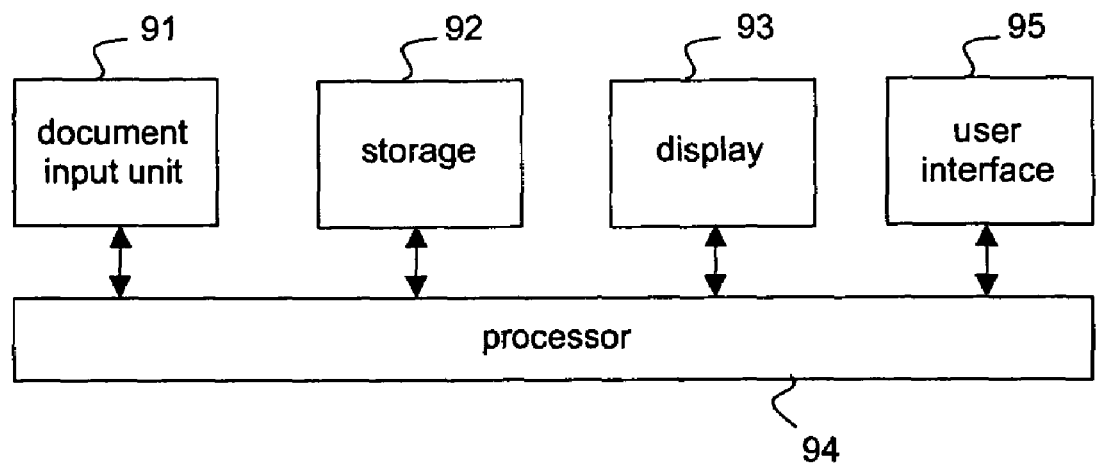
FIG. 10 shows a device for segmenting a picture according to an embodiment of the present invention.

FIG. 10 shows a device for segmenting a picture according to an embodiment of the present invention. The various methods of the present invention are implementable using the device of FIG. 10 or other suitable devices. Referring to FIG. 10, the device has an input unit 91 for entering a digital image. The input unit 91 may comprise a scanning unit for scanning an image from physical documents such as an electro-optical scanner, and/or a digital communication unit for receiving the image from a network like internet, and/or a playback unit for retrieving digital information from a record carrier like an optical disc drive. The input unit 91 is coupled to a processing unit 94, which cooperates with a memory unit 92. The processing unit 94 may comprise a general purpose computer central processing unit (CPU) and supporting circuits and operates using software for performing the segmentation as described above. The processing unit 94 may include a user interface 95 provided with control means such as a keyboard, a mouse device or operator buttons. The output of the processing unit 94 is coupled to a display unit 93. The display unit 93 may comprise a display screen, a printing unit for outputting a processed image on paper or other medium, and/or a recording unit for storing the segmented image on a record carrier like a magnetic tape or optical disk.

The processing steps of the present invention are implementable using existing computer programming language. Such computer program(s) may be stored in memories such as RAM, ROM, PROM, etc. associated with computers. Alternatively, such computer program(s) may be stored in a different storage medium such as a magnetic disc, optical disc, magneto-optical disc, etc. Such computer program(s) may also take the form of a signal propagating across the Internet, extranet, intranet or other network and arriving at the destination device for storage and implementation. The computer programs are readable using a known computer or computer-based device.

Although the invention has been mainly explained by embodiments using a Japanese newspaper page as the digital image to be segmented, the invention is also suitable for any digital representation of any text or image having a layout in fields on a background, such as electrical circuits in layout images for IC design or streets and buildings on city maps. It is noted that in the present document, the use of the verb 'comprise' and its conjugations does not exclude the presence of other elements or steps that are not listed and the word 'a' or 'an' preceding an element does not exclude the presence of a plurality of such elements, that any reference signs do not limit the scope of the claims, that the invention and every unit or means mentioned may be implemented by suitable hardware and/or software and that several 'means' or 'units' may be represented by the same item. Further, the scope of the invention is not limited to the embodiments, and the invention lies in each and every novel feature or combination of features described above.

The invention claimed is:

1. A method of segmenting a composite image of pixels of a physical document into a number of fields corresponding to lay-out elements of the image of the physical document, the pixels having a value representing the intensity and/or color of a picture element, the method comprising:

analyzing the pixels of the image as either background pixels having a background property indicative of a background of the image or foreground pixels not having said background property;

detecting in the image any foreground separator elements that are objects in the foreground of the image having a pattern of foreground pixels;

replacing the pixels of the detected foreground separators by pixels having the background property;

constructing separating elements corresponding to rectangular areas of adjacent pixels of the image having the background property; and constructing a graph representing the lay-out elements of the image of the physical document by defining vertices of the graph on the basis of intersections of separating elements that are substantially oriented in predetermined separation directions, defining edges of the graph between the vertices corresponding to the separating elements, and defining field separators corresponding to the edges of the graph.

2. The method as claimed in claim 1, wherein the step of defining vertices comprises:

constructing subsets of the separating elements that are substantially oriented in the predetermined separation directions, and determining the intersections between pairs of separating elements from the subsets.

3. The method as claimed in claim 2, wherein the step of determining the intersections comprises:

determining an area of overlap of the separating elements from the subsets, and locating the vertex at the center of the area of overlap.

4. The method as claimed in claim 1, wherein the graph constructing step comprises:

assigning a weight to the edges indicating an Euclidean distance between the vertices.

5. The method as claimed in claim 1, further comprising:

constructing a set of maximal rectangles, a maximal rectangle being a rectangular part of the image in one of the separation directions, that has the maximum possible area without including a pixel not having the background property indicative of a background of the image; and constructing the separating elements in a cleaning step wherein at least one pair of overlapping maximal rectangles in the set is replaced by an informative rectangle that is a rectangular part of an area combining the areas of the pair, the rectangular part having the maximum possible length in the relevant separation direction.

6. The method as claimed in claim 5, wherein the cleaning step further comprises at least one of the following:

deleting a maximal rectangle having a length below a predefined value,
deleting a maximal rectangle having a width below a predefined value, and
deleting a maximal rectangle having an aspect ratio below a predefined value, the aspect ratio being a longer side length divided by a shorter side length.

7. The method as claimed in claim 5, wherein, prior to the step of constructing the maximal rectangles, the image is preprocessed by at least one of the following:
removing noise by adapting the value of isolated deviant pixels to an average value of pixels in the neighborhood,
halftoning by transforming the pixels to either white or black, and
reducing the number of pixels by downsampling.

8. The method as claimed in claim 1, wherein the foreground separator elements include black lines, dashed lines, or dotted lines.

9. The method as claimed in claim 5, wherein the step of constructing the maximal rectangles comprises:
determining a list of maximal runs, a maximal run being a straight line of pixels having the background property, the line having the maximum possible length without including a pixel not having the background property,
taking a specific maximal run from the list as rectangle,
testing the rectangle if extension is possible by determining for a next maximal run if the next maximal run comprises pixels adjacent to pixels of the rectangle in a width direction,
if the extension is possible, extending the rectangle by constructing a new rectangle having the maximum area including pixels of the rectangle and the next maximal run,
if no extension is possible, adding the rectangle to the set of maximal rectangles, and
eliminating from the list any maximal run that is completely contained in the new rectangle.

10. The method as claimed in claim 1, wherein the step of constructing the separating elements comprises:
processing the image in two orthogonal separation directions.

11. The method as claimed in claim 1, wherein the step of constructing the separating elements comprises:
detecting graphical elements that are objects in the foreground of the image having a pattern of pixel values deviating from said background property, wherein the separating elements are constructed around the graphical elements.

12. The method as claimed in claim 1, wherein at least one of the fields is classified as text field, a reading order is detected in the text field, and foreground components are joined to text lines in the text field in a direction corresponding to said reading order.

13. A computer-readable storage medium containing a computer program comprising computer-executable instructions for segmenting an image of pixels into a number of fields, corresponding to lay-out elements of the image, the pixels having a value representing the intensity and/or color of a picture element, the computer program product comprising computer-executable instructions for:
analyzing the pixels of the image as either background pixels having a background property indicative of a background of the image or foreground pixels not having said background property;
detecting in the image any foreground separator elements that are objects in the foreground of the image having a pattern of foreground pixels;
replacing the pixels of the detected foreground separator elements by pixels having the background property;
constructing separating elements corresponding to rectangular areas of adjacent pixels of the image having a background property; and
constructing a graph representing the lay-out elements of the image by
defining vertices of the graph on the basis of intersections of separating elements that are substantially oriented in predetermined separation directions,
defining edges of the graph between the vertices corresponding to the separating elements, and
defining field separators corresponding to the edges of the graph.

14. The computer-readable storage medium as claimed in claim 13, wherein the computer-executable instructions for defining vertices comprise computer-executable instructions for:
constructing subsets of the separating elements that are substantially oriented in the predetermined separation directions, and
determining the intersections between pairs of separating elements from the subsets.

15. The computer-readable storage medium as claimed in claim 13, wherein at least one of the fields is classified as text field, a reading order is detected in the text field, and foreground components are joined to text lines in the text field in a direction corresponding to said reading order.

16. The computer-readable storage medium as claimed in claim 13, further comprising computer-executable instructions for:
constructing a set of maximal rectangles, a maximal rectangle being a rectangular part of the image in one of the separation directions, that has the maximum possible area without including a pixel not having the background property indicative of a background of the image; and
constructing the separating elements in a cleaning step wherein at least one pair of overlapping maximal rectangles in the set is replaced by an informative rectangle that is a rectangular part of an area combining the areas of the pair, the rectangular part having the maximum possible length in the relevant separation direction.

17. A device for segmenting a composite image of pixels into a number of fields corresponding to lay-out elements of the image, the pixels having a value representing the intensity and/or color of a picture element, the device comprising:
an input unit for inputting an image; and
a processing unit for analyzing the pixels of the image as either background pixels having a background property indicative of a background of the image or foreground pixels not having said background property; detecting in the image any foreground separator elements that are objects in the foreground of the image having a pattern of foreground pixels; replacing the pixels of the detected foreground separators by pixels having the background property; and constructing a graph representing the lay-out elements of the image by
constructing separating elements corresponding to rectangular areas of adjacent pixels of the image having a background property,
defining vertices of the graph based on intersections of separating elements that are substantially oriented in different separation directions, and
defining edges of the graph between the vertices corresponding to the separating elements.

18. The device as claimed in claim 17, further comprising: a display unit for displaying fields of the image after segmenting.

19. The device as claimed in claim 17, wherein the processing unit constructs a set of maximal rectangles, a maximal rectangle being a rectangular part of the image in one of the separation directions, that has the maximum possible area without including a pixel not having the background property indicative of a background of the image; and constructs the separating elements in a cleaning step wherein at least one pair of overlapping maximal rectangles in the set is replaced by an informative rectangle that is a rectangular part of an area combining the areas of the pair, the rectangular part having the maximum possible length in the relevant separation direction.

20. The device as claimed in claim 17, wherein at least one of the fields is classified as text field, a reading order is detected in the text field, and foreground components are joined to text lines in the text field in a direction corresponding to said reading order.

21. The method as claimed in claim 1, wherein the rectangular areas are white areas.

22. The computer-readable storage medium as claimed in claim 13, wherein the rectangular areas are white areas.

23. The device as claimed in claim 17, wherein the rectangular areas are white areas.

* * * * *